Patented Mar. 27, 1934

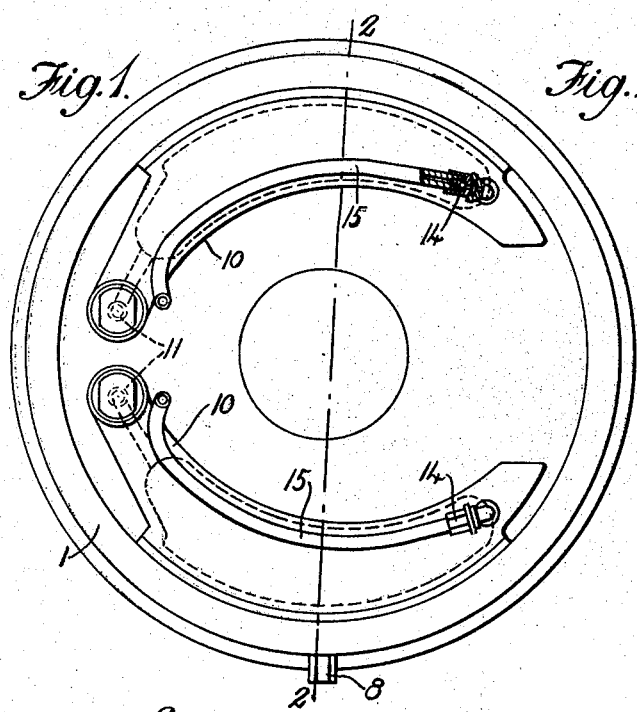

1,952,967

UNITED STATES PATENT OFFICE 1,952,967

BRAKE COOLING MEANS

Edward Bishop Boughton, London, England

Application September 8, 1930, Serial No. 480,551
In Great Britain September 24, 1929

7 Claims. (Cl. 188—264)

This invention relates to brakes and more particularly to brakes of motor road vehicles.

In vehicle braking mechanism, especially as applied to road transport, the heavy loads carried and the high speeds attained, with the consequent greater amount of energy to be absorbed when it is necessary to reduce the speed of a vehicle or bring it to rest, are causing previously known air-cooled systems to reach their peak of reliability, owing to the lack of effective means for readily dissipating the heat generated by friction between the braking surfaces.

According to the present invention, the heat generated by friction between the braking surfaces is dissipated or absorbed by utilizing such heat to convert water or other fluid into steam or vapour, thereby more effectively absorbing the heat and keeping the braking surfaces, brake drums, shoes or the like at a reasonably low working temperature and enabling a more effective vehicle brake, size for size, than any at present known to be obtained. In order to conserve the supply of fluid, the outlet for the steam or vapour is controlled by means of a valve which can be set to open at any predetermined pressure, and the exhaust steam may be utilized to induce an increased flow of air over the surface of one or more of the brake elements.

According to a further feature of the invention, means are provided for automatically replenishing the water or other cooling fluid as or when it is evaporated. Such means may, for instance, consist of non-return inlet and outlet valves connected to the fluid chamber or chambers so that, by reason of the partial vacuum in the chamber or chambers on subsequent cooling, a fresh supply of fluid will be drawn in through the inlet valve.

The means for carrying out the method specified may vary according to requirements and to the particular construction of brake. Thus, the brake drum may be formed or provided with a fluid chamber which may be constituted by an external jacket. Alternatively, or in addition, the brake shoes may be formed or provided with fluid chambers. Each chamber is provided with an outlet which preferably consists of a spring-loaded non-return valve adapted to permit the escape of the steam or vapour at a predetermined pressure, and this valve may serve as a filler cap to close an orifice through which cooling fluid is initially introduced into the chamber. Preferably, however, the chamber or chambers is or are connected to a fluid reservoir by way of non-return valves arranged so that on a partial vacuum occurring in the chamber or chambers liquid is drawn in from the reservoir. The steam or vapour generated may be led through a suitable channel or channels and discharged through a nozzle or nozzles in such manner as to induce a flow of air over the exterior of the brake drum or other part of the brake, inclined or helically arranged vanes or the like advantageously being provided on the brake drum so as to direct and to assist the flow of steam and induced air over a comparatively large part of the drum.

The invention is hereinafter described by way of example with reference to the accompanying diagrammatic drawing, in which:—

Figure 1 is a side elevation illustrating the application of the invention to a two-shoe vehicle brake, the fixed plate being removed;

Figure 2 is a vertical section on the line 2—2, Fig. 1;

Figure 3 is a view similar to Figure 1 illustrating a modification; and

Figure 4 is an end elevation partly in section corresponding to Figure 3.

In carrying the invention into effect according to one construction and with reference to Figures 1 and 2 of the accompanying diagrammatic drawing, the drum 1 of a brake of a road vehicle wheel is formed externally with a series of circumferentially extending fins 2. At each end of the cylindrical portion of the drum a flange or fin 3 is provided, such flanges or fins 3 being at least of equal external diameter with the fins 2. A cylindrical sleeve 4, equal in internal diameter to the maximum diameter of the flanges or fins 3, is secured in position on the latter as by brazing to form therewith a jacket 5 for cooling fluid, such jacket enclosing the intermediate fins 2 which provide a large surface area for the transference of heat from the brake drum 1 to the cooling jacket 5. A socket 6 is fitted into an opening in the sleeve 4, such socket having a tube 7 which extends to a position near the outer surface of the cylindrical part of the brake drum, this fitting serving, if desired, for filling the jacket 5 with fluid. The socket 6 may be screw-threaded for the reception of a pressure release valve 8 the spring 9 of which may be so loaded that steam or vapour will not escape until a predetermined pressure is attained. The arrangement of the tubular extension 7 ensures that only steam will escape through the valve 8 when the fluid in the jacket 5 evaporates. The heat generated when braking, is given out first to the fluid, raising the latter to its boiling temperature, and then further heat is absorbed by the latent heat required to turn the fluid into steam or vapour. The provision of the spring-loaded valve 8 not only ensures that the pressure in the jacket 5 will not exceed a predetermined or safe limit, but also obviates excessive wastage of fluid by evaporation such as would occur if the outlet were free or uncontrolled.

Within the brake drum 1 two brake shoes 10 are mounted upon pivots 11 in the usual manner. Each brake shoe is, as shown more especially in Figure 2, of hollow formation to provide a fluid chamber 10a, and each pivot pin 11 is fitted at the end which extends through the usual fixed plate 12 with a non-return valve 13 for the injection or supply of fluid to the respective chamber 10a by way of a bore 11a in the pin 11 communicating through a passage 11b with the chamber 10a. At the opposite or free end of the brake shoe 10 a pressure release valve 14, similar to the valve 8, is provided, such valve 14 being connected to a vent or outlet pipe 15 which preferably extends alongside the shoe 10 to a point adjacent the pivot 11 where it passes through a slot 16 in the fixed plate 12 so that any steam escaping is led away at the exterior of the brake mechanism. The valves 8, 14 also serve as vents for permitting the escape of air when the respective chambers 5 and 10a are being filled with cooling fluid.

It is intended that in a brake according to the invention, the water or other cooling fluid should, at normal temperature, be in liquid form and that, when braking takes place, the consequent rise in temperature will cause the fluid to boil so that a large amount of heat would be absorbed owing to the latent heat of vaporization of the fluid, the pressure release valve or valves 8, 14 being adjusted so as to maintain a predetermined pressure in the chambers 5, 10a.

If desired, a whistle or other alarm may be provided to act as soon as the pressure release valves 8, 14 permit the escape of steam so that the driver may know approximately how much longer he may safely proceed with his brakes exerting their maximum effort.

In a modification, as illustrated in Figures 3 and 4, the jacket around the brake drum may be dispensed with, only the brake shoes 10 being provided with the fluid chambers 10a as before described, and means are provided to conduct the escaping steam to the rim of the brake drum 1 where it is discharged through one or more ejector tubes or nozzles 17 which thereby serve to induce a large volume of air across series of cooling fins 18. These cooling fins 18 preferably are arranged at an angle to the axis of the drum 1, as shown, the fins acting to assist in drawing the air and steam away from the ejector nozzles 17. Thus, in this construction, the cooling of the shoes 10 and drum 1 is effected first by the water or other cooling fluid, then, after the latter has boiled, by the conversion of the same into steam or vapour, and finally by the streams of steam and air produced by the ejector nozzles 17. The fluid inlet non-return valves 13 may be connected to a fluid reservoir from which the fluid will be automatically withdrawn to replenish the chambers 10a as it is evaporated, by the vacuum or partial vacuum caused on cooling down, the non-return valves 13 being opened by the vacuum and automatically closed when the chambers 10a are replenished. The steam generated will escape through the pressure release valves 14 (Figure 3) and is conducted through a radial pipe or pipes 19, such pipe 19 being connected to an annular pipe 19' leading to and perforated within the ejector nozzles 17, the pipes 19 conveniently being connected to the pipes 10 by means of a common channel 20 communicating with the respective pipes 15 through channels 21 in a bridge piece 22 connected to the ends of the pivot pins 11 which are provided with cooperating passages 23. The flow of steam and air over the rim of the drum may be confined by means of an external sleeve 24.

It will be obvious that one common fluid supply reservoir may be used for all the brakes on a vehicle and also that the cooling fluid may be made to circulate throughout the whole or a part of the braking system. It will also be understood that various changes may be made in the practical application of the invention to suit brakes of different kinds than those which have been hereinbefore described only by way of example.

What I claim is:—

1. A method of dissipating or absorbing the heat generated by friction between braking surfaces consisting in utilizing such heat to convert water into steam, predetermining the pressure at which the steam is permitted to escape, and utilizing the escaping steam to induce an increased flow of air over at least one such braking surface.

2. A means for dissipating or absorbing the heat generated by the friction between a brake drum and brake shoes comprising a hollow brake shoe, a channel for introducing the cooling fluid into said hollow shoe, a conduit for directing the escape of the steam generated from such cooling fluid by the heat of the braking action, and means for utilizing the escaping steam to draw a current of air over the brake drum.

3. A means for dissipating or absorbing the heat generated by friction between brake shoes and a brake drum comprising hollow brake shoes, an inlet for cooling fluid leading to said hollow shoes, an outlet for the steam generated from the cooling fluid by the heat of the braking action, a casing encircling and spaced from the brake drum, and means for utilizing the escaping steam for drawing air through said casing.

4. A method of dissipating or absorbing the heat generated by friction between braking surfaces, consisting in absorbing the heat by utilizing such heat for converting a cooling medium into a different form and utilizing such medium in said different form as a means for drawing air into contact with certain of the surfaces to be cooled.

5. Means for dissipating or absorbing the heat generated by friction between braking surfaces, at least one of which is formed as a chamber including means for introducing a cooling fluid into the chamber, means for providing for the escape of the vapor products of such cooling fluid incident to the absorbed heat at a predetermined pressure, and means for utilizing the movement of the escaping vapor products for drawing air into heat-absorbing contact with the braking surfaces.

6. Means for dissipating or absorbing the heat generated by friction between the brake drum and brake shoe, comprising a hollow brake shoe adapted to contain a heat convertible fluid, a conduit for directing the escape of the vapor generated in the conversion of the fluid, and nozzles through which the escaping vapors are directed, said nozzles being open to the air and arranged to direct the air drawn through the nozzles by the escaping vapors over and in contact with the brake drum.

7. Means for dissipating or absorbing the heat generated by friction between the brake drum and brake shoe, comprising a hollow brake shoe adapted to contain a heat convertible fluid, a conduit for directing the escape of the vapor generated in the conversion of the fluid, nozzles through which the escaping vapors are directed, said nozzles being open to the air and arranged to direct the air drawn through the nozzles by the escaping vapors over and in contact with the brake drum, and an element surrounding and arranged in spaced relation to the brake drum to more or less confine the air moving over such brake drum surface.

EDWARD BISHOP BOUGHTON.